CHARLES WARNER.
Improvement in Cultivators.
No. 124,922. Patented March 26, 1872.
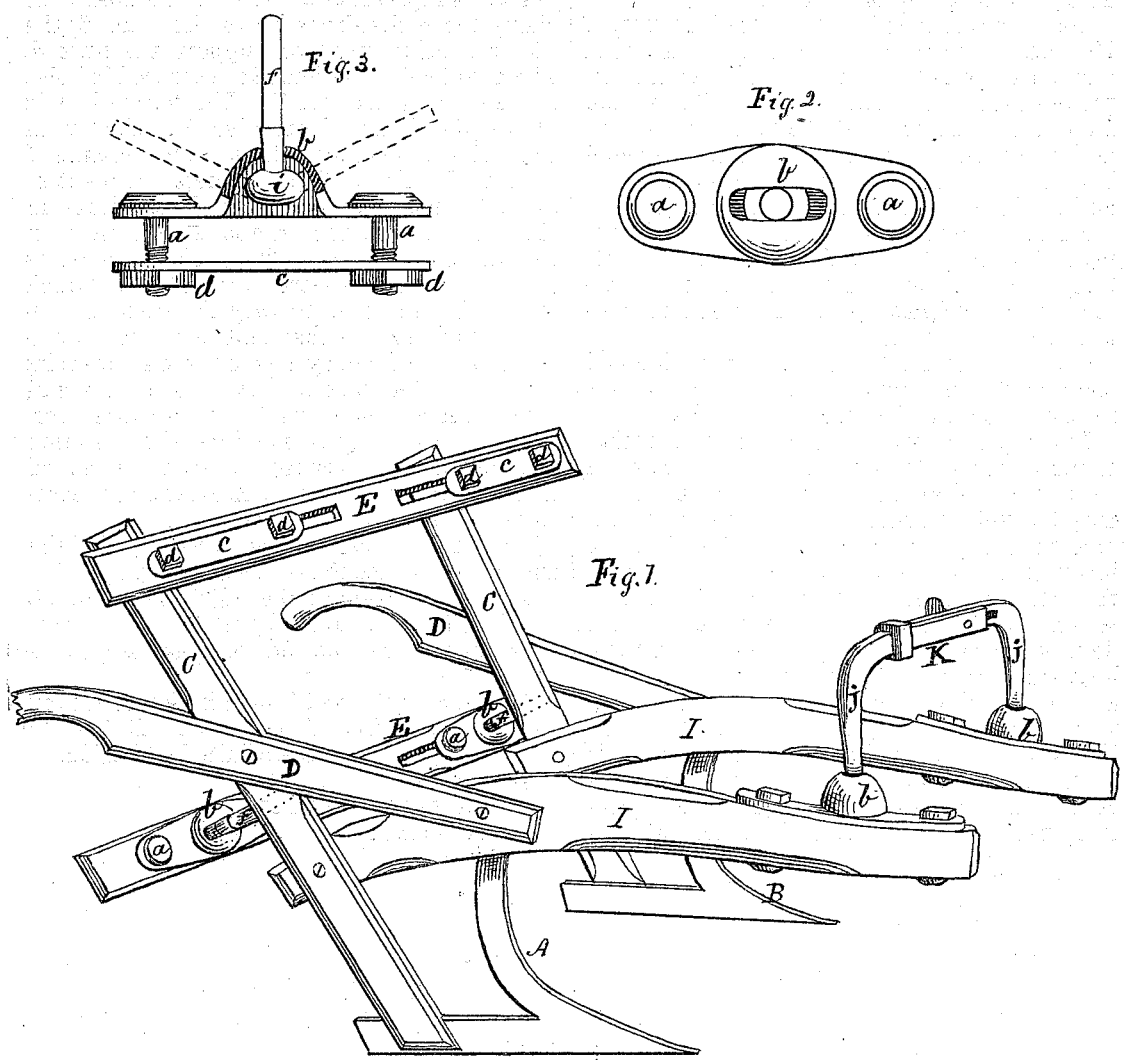

124,922

UNITED STATES PATENT OFFICE.

CHARLES WARNER, OF MONROE, OHIO.

IMPROVEMENT IN CULTIVATORS.

Specification forming part of Letters Patent No. 124,922, dated March 26, 1872.

*To all whom it may concern:*

Be it known that I, CHARLES WARNER, of Monroe, in the county of Butler and State of Ohio, have invented a new and useful Improvement in Couplings for Corn-Plows; and I do hereby declare that the following is a full and exact description thereof, reference being had to the annexed specification and drawing and the letters of reference marked thereon.

Figure 1 represents a perspective view of my improved plow-couplings as applied. Fig. 2 represents a front view of one of the coupling-joints detached. Fig. 3 represents a horizontal section of the same.

My invention relates to the construction and combination of adjustable flexible couplings for corn-plows, as hereinafter described.

In using two corn-plows connected together to plow the soil toward or from the rows of corn, it is desirable to connect them that there may be sufficient freedom of operation to enable each plow to accommodate itself to the inequalities of the work, and also to permit the attendant to easily govern their operations severally. To obtain such advantages I have devised a combination of ball-and-socket couplings and adjustable bars, by which the plows are connected as represented in the drawing. The plows A B are provided with standards C. The single handle, D, of each plow is bolted to the standard C, and to the plow-beam I, and the standards are coupled together by the slotted bars E and flexible socket-joints, as represented. The bolts $a$ $a$ serve to clamp the socket-irons $b$ $c$ to the bars E, the plates $c$ being used to support the nuts $d$. The shanks $f$ of the balls $i$ are secured in holes made in the standards C. The forward ends of the plow-beams I are also furnished with the ball-and-socket joints. The shanks J J of the balls in these sockets are bent so as to be coupled together and constitute an elevated yoke, K, to pass above the corn when the plows are in use. This yoke-coupling is provided with a set-screw and loop by which it may be adjusted to vary the distance between the plow-beams; and the like adjustment may be made by means of the screw-bolts $a$ $a$ and slotted bars E. By these means sufficient freedom of operation is provided for, and the plows may be so adjusted in relation to each other as to cause the soil to be moved laterally toward or from each other or the corn-rows as the plows progress.

Having fully described my invention, I claim and desire to secure by Letters Patent—

The combination of the adjustable flexible coupling $b$ $i$ $f$ and E E K with the two plows, substantially as and for the purpose specified.

In testimony hereof I have hereunto set my hand this 24th day of October, A. D. 1871.

CHARLES WARNER.

Witnesses:
EDWARD KIMBALL,
R. V. ROLL.